Dec. 16, 1969  S. F. D'AMATO ET AL  3,483,772
ROTARY INDEXING APPARATUS

Filed July 29, 1968  5 Sheets-Sheet 1

INVENTORS
SALVATORE F. D'AMATO
KENNETH R. WILLIAMS
BY CLIFFORD D. GUERTIN

Christopher C. Dunham
ATTORNEY

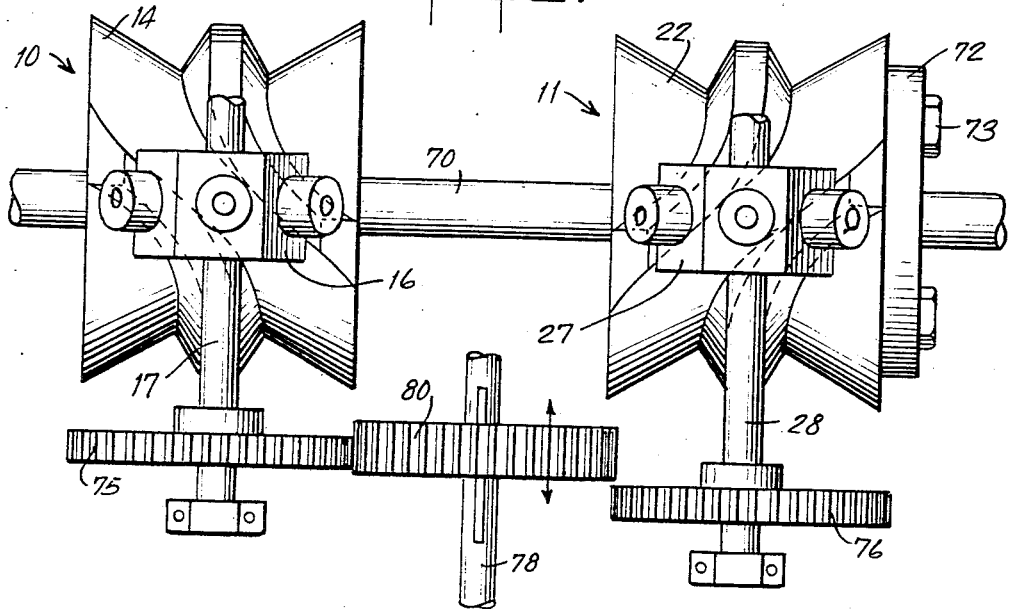
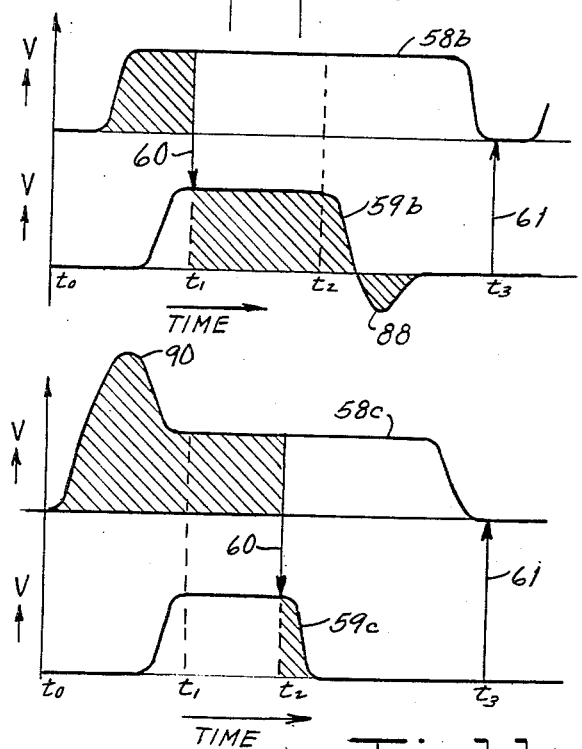
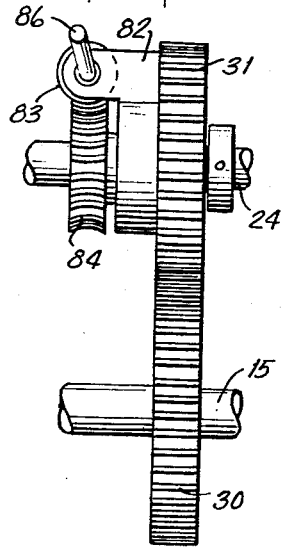

United States Patent Office 3,483,772
Patented Dec. 16, 1969

3,483,772
ROTARY INDEXING APPARATUS
Salvatore F. D'Amato, Floral Park, and Kenneth R. Williams, Eastchester, N.Y., and Clifford D. Guertin, River Vale, N.J., assignors to American Bank Note Company, New York, N.Y., a corporation of New York
Filed July 29, 1968, Ser. No. 748,546
Int. Cl. B23b 29/24; B23q 17/00; B65h 17/22
U.S. Cl. 74—821                                    12 Claims

ABSTRACT OF THE DISCLOSURE

An intermittent rotary drive including a pair of indexing devices connected to be driven together by an input shaft providing continuous unidirectional rotary input motion, and means for alternately coupling the two devices to an output shaft. Each of the devices has an output member which undergoes intermittent rotary motion comprising a succession of drive periods of predetermined magnitude with intervening dwell periods of predetermined length. During at least a portion of each drive period, each output member is advanced in a given direction at a constant or steady-state angular velocity, the steady-state angular velocities of the two output members being substantially equal. Means are provided for varying the time of initiation of drive periods of one of the two drive members relative to that of the other. The coupling means includes a rotary element shiftable between the two output members and selectively engageable with either of them for transmitting rotary motion from the engaged member to the output shaft, and means for shifting the rotary element from one output member to the other at times at which the difference between their angular velocities is zero. With the aforementioned constant-velocity portions of the drive periods of the two output members set to overlap, the rotary element engages one of them at the start of the indexing cycle and is shifted to the other during the overlapping portions of their respective drive periods, being shifted back to the first output member (for the start of the next indexing cycle) during the subsequent stationary dwell periods of the two members. In this way, during each indexing cycle the output shaft is driven successively by the two output members, through a drive period commencing at the start of the drive period of the first-coupled output member and terminating at the end of the drive period of the second-coupled output member; and the magnitude of the output shaft drive period may be varied by varying the relative times of initiation of the individual drive periods of the two output members.

BACKGROUND OF THE INVENTION

This invention relates to mechanical movements for converting continuous unidirectional rotary motion to intermittent rotary motion, and more particularly to rotary indexing apparatus for effecting step-by-step displacement of a machine element or the like. In a specific sense the invention is directed to rotary indexing apparatus wherein the magnitude of the output drive period (i.e., the extent of angular displacement of the output shaft during each indexing cycle) may be precisely varied.

Indexing devices for converting continuous unidirectional rotary motion to intermittent rotary motion are widely used, for example, to effect step-by-step advance of article-handling machine elements. Typically, each output cycle of such a device includes a drive period during which the driven element is advanced through a predetermined angle and a dwell period during which the driven element is stationary; hence each complete revolution of the driven element is accomplished as a succession of discrete angular displacements with a corresponding number of stops between displacements.

Various known rotary indexing devices of the cam-and-follower type provide high precision indexing, i.e., highly exact output angular displacement in each output drive period, as desired or necessary for particular operations. In these devices, the magnitude of the drive period is fixed by the configuration of the cam surface, and therefore cannot be altered. It would, however, be advantageous for certain purposes to be able to vary the magnitude of the output drive period of a high-precision indexing device, so that a machine incorporating such device could be used to perform a variety of operations requiring indexing periods of different magnitudes, with desired exactitude of indexing in each of these different operations.

By way of specific example, in continuous-web printing wherein successive impressions are printed on a longitudinally moving web of paper or the like, the web being advanced intermittently (in correspondence with the application of the impressions thereto) in increments having a magnitude determined by the longitudinal dimension of the impression, a rotary indexing device is sometimes employed to drive a web-engaging rotary element which effects advance and/or maintains register of the web in the press. For assured proper web register, it is important that the extent of each angular advance of the rotary element be very precisely controlled. Some continuous web presses can accommodate printing plates which produce impressions of various different lengths, and it would be desirable to adjust the magnitude of the indexing period (which controls the extent of incremental advance of the web) to conform to the length of the particular impression being printed in any given instance; but it has not heretofore been possible to effect such adjustment, in presses incorporating a high-precision indexing device of the aforementioned type, since as explained the drive period magnitude of these devices is fixed by the cam surface shape.

SUMMARY OF THE INVENTION

The present invention broadly contemplates the provision of rotary indexing apparatus including first and second independently rotatable driven members; driving means operable by a continuous unidirectional rotary input drive for effecting individual intermittent rotary motion of the two driven members in predetermined time relation to each other, each period of intermittent rotary motion of each driven member including at least a portion during which it is advanced in a given direction at a constant or steady-state angular velocity, the steady-state angular velocities of the two driven members being substantially equal to each other; means shiftable between and selectively engageable with the first and second driven members for transmitting to an output shaft rotary motion of the engaged driven member; and means operable by the input drive for alternately shifting the transmitting means into engagement with the first and second driven members, at predetermined times (in relation to the intermittent motion of the driven members) at which the difference in angular velocities of the driven members is zero—i.e., when the two driven members are either both rotating at steady-state angular velocity, or both stationary.

In this apparatus, rotation of each driven member is accomplished as a succession of indexing cycles each including a drive period during which the member moves through a predetermined angle, and a stationary dwell period of predetermined length. As a further feature of the invention, means are provided for varying the time of initiation of drive periods of one of the driven members of relative to that of the other. With the constant-velocity portions of the drive periods of the two driven members set to overlap, the transmitting means is shifted from initial engagement with the first driven member into engagement with the second driven member during the overlapping constant-velocity portions of the two drive periods, and then shifted back to the first driven member during an overlapping portion of the stationary dwell periods of the two members, in each indexing cycle. The output shaft is thus successively coupled to the two driven members, and has a drive period extending from the start of the drive period of the first driven member to the end of the drive period of the second driven member. By varying the time relationship between the initiation of drive periods of the two driven members, the magnitude of this output shaft drive period can be changed.

In an illustrative embodiment, the apparatus of the invention includes a pair of rotary indexing devices (e.g., individually conventional cam-and-follower indexing units) each having a rotatable driven follower member and a cam engaging the driven member for effecting intermittent rotary motion thereof in correspondence with continuous unidirectional rotary motion of the cam. The cams of the two devices together consitute the driving means of the apparatus, and are connected to be rotated simultaneously by an input shaft. To one of the cams there is connected an element for adjusting the angular orientation of that cam relative to the angular orientation of the other cam about the respective cam axes, thereby to vary the relative times of initiation of drive periods of the two driven members.

A rotary output member, operatively connected to an output shaft, is mounted for rotation about a given axis and for translation along that axis, the disposition of the two driven members and of the output member being such that by translation along the aforementioned given axis, the output member is alternatively engageable with the two driven members, so as to be alternately driven by (and to impart to the output shaft) rotary motion of the two driven members. The output members is slidably engaged by means, actuated by the input shaft, for effecting translation of the output member from one driven member to the other at predetermined times (in relation to the drive periods of the two driven members) at which the difference in angular velocities of the two driven members is zero.

In this apparatus, in accordance with the general principles of operation described above, the output shaft is successively coupled with each of the two driven members during each indexing cycle, and has a drive period extending from the beginning of one driven-member drive period to the end of the other, the magnitude of this output shaft drive period being variable by adjustment of the means for varying the relative angular orientation of the two cams. The apparatus may therefore be employed to provide indexing motions of different magnitudes as desired for performance of different operations, e.g., in continuous-web printing presses or other forms of equipment. At the same time, the apparatus affords the high precision indexing provided by its individual component indexing units, because these units control the acceleration, deceleration and arrest of the output shaft as well as the magnitude of the output shaft drive period.

Further features and advantages of the invention will be apparent from the detailed description hereinbelow set forth, together with the accompanying drawings.

BRIEF DESCRIPTION OF THE DRAWINGS

FIG. 8 is a plan view of a further modified embodiment of the invention;

FIG. 9 is a fragmentary plan view of an alternative structure for varying the output phase relationships of the two indexing devices in the apparatus of FIGS. 1-3;

FIG. 10 is a graph similar to FIG. 4A illustrating operation of the apparatus of FIGS. 1-3 when the output drive period of one of the indexing devices includes a portion during which the follower member of the device is driven in reverse direction; and FIG. 11 is another graph similar to FIG. 4 illustrating operation of the apparatus when the output drive period of one of the indexing devices includes a portion during which the follower member is driven at a velocity greater than the steady state angular velocity of the follower member of the other indexing device.

DETAILED DESCRIPTION

Figure 1:
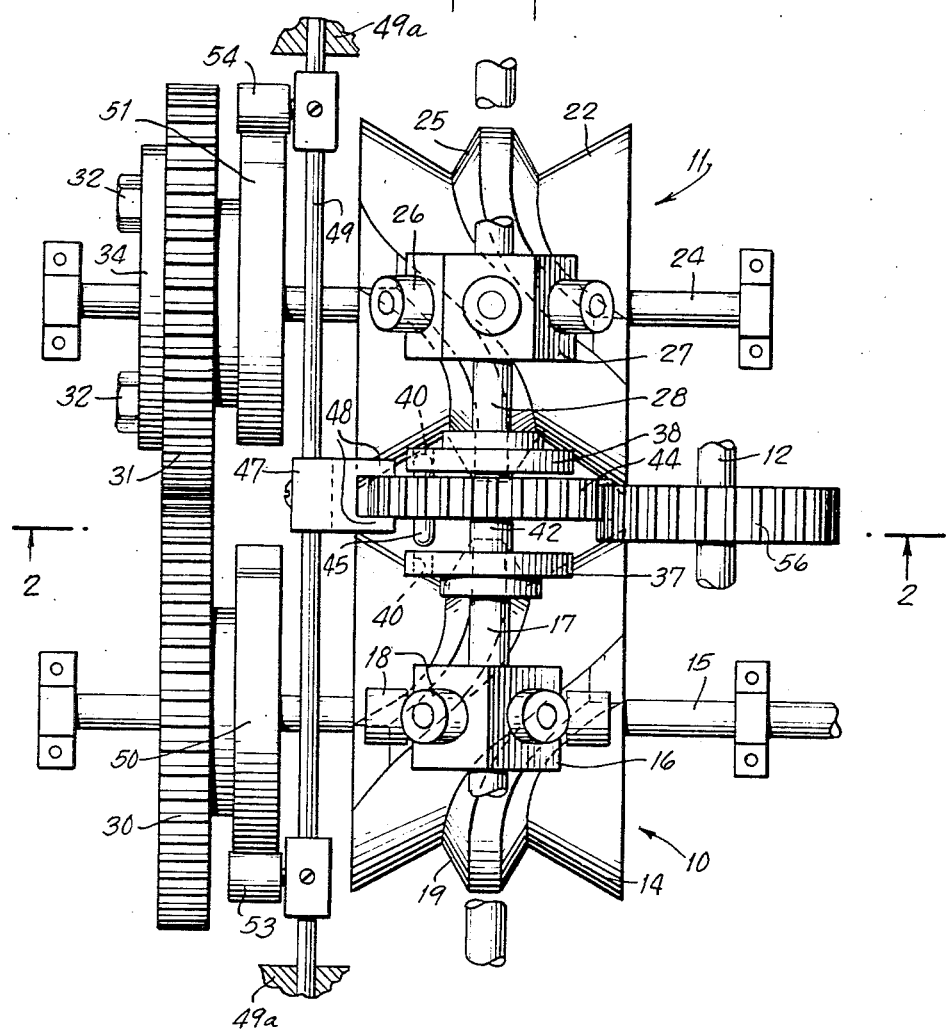
FIG. 1 is a plan view of rotary indexing apparatus embodying the present invention in a particular form.
Figure 2:
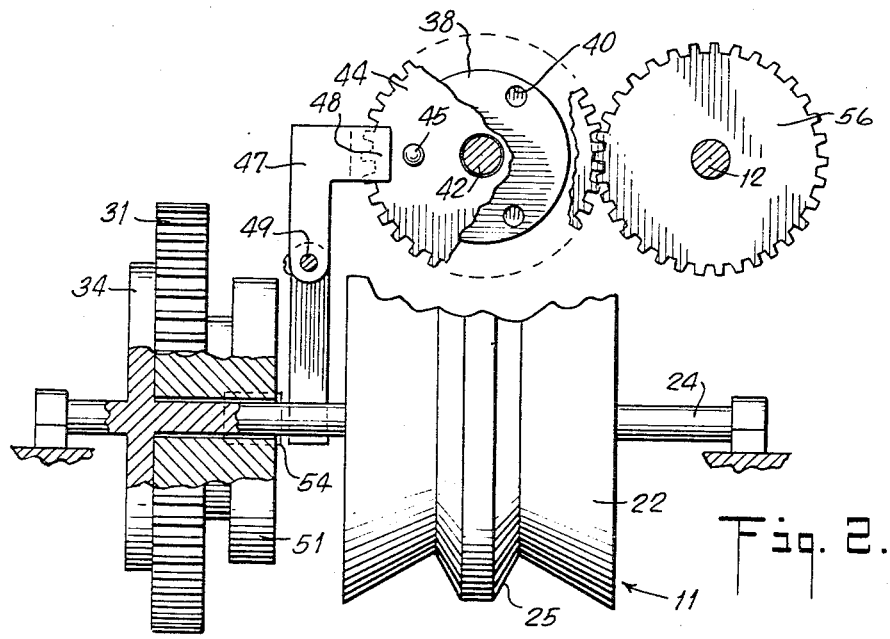
FIG. 2 is a view taken along the line 2—2 of FIG. 1.
Figure 3:
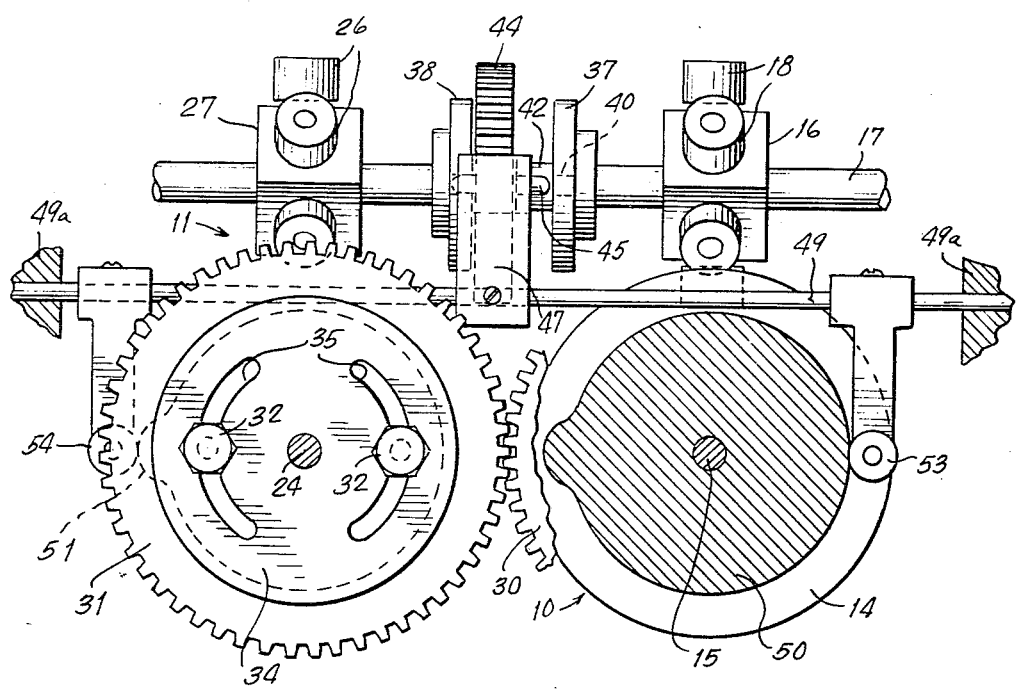
FIG. 3 is a side elevational view of the apparatus of FIG. 1.

Referring first to FIGS. 1-3, the apparatus of the invention in the form there shown in cludes a pair of rotary indexing devices respectively designated 10 and 11, connected as hereinafter described to be driven simultaneously by continuous unidirectional rotary motion imparted by an input shaft (not shown) and to produce intermittent rotary motion (e.g., unidirectional intermittent rotation) of an output shaft 12.

Each of the devices 10 and 11 is an individually conventional high-precision indexing unit of the cam-and-follower type for converting continuous unidirectional rotary input motion to intermittent unidirectional rotary output motion. Thus, the device 10 may comprise a cylindrical barrel cam 14 mounted on a shaft 15 for rotation about its axis, and a roller gear follower member 16 mounted on a shaft 17 for rotation in a plane perpendicular to the plane of rotation of the barrel cam, the shafts being journalled in suitable bearing structure. The follower member bears a plurality of rollers 18 regularly spaced around its periphery, and is so disposed that during operation of the device these rollers are successively engaged by a cam track (shown as a tapered rib 19) formed on the cylindrical surface of the barrel cam and extending generally around the circumference of the barrel cam.

In accordance with conventional principles of barrel cam design for indexing devices of the type shown, the rib 19 is shaped to effect rotary displacement of the follower member 16 through a predetermined angle during each revolution of the barrel cam 14. This displacement is produced by lateral force exerted (as the barrel cam rotates) by portions of the rib on a follower member roller 18 engaged by the rib, it being understood that the motion imparted by any given portion of the rib to the follower member is determined by the anglar orientation of such rib portion relative to the plane of rotation of the barrel cam. In an illustrative example of such cam, the shape of the motion-imparting portions of the rib is such that the follower member is always rotated in the same direction, for a given direction of rotation of the cam, although the cam rib may alternatively be shaped to impart both forward and reverse motion to the follower member during each follower member drive period. In the specific case of a rib shaped to impart unidirectional rotary motion to the follower, the rib includes successive portions respectively shaped to impart acceleration to the follower member, to impart continuing rotary motion to the follower member at a constant or steady-state angular velocity, to effect deceleration of the follower member and to hold the follower member in a stationary position.

As the barrel cam turns through a complete revolution, these four rib portions successively engage a roller of the follower member 16, and the angular displacement of the follower member brings its several rollers successively into such engagement with the rib during successive revolutions of the barrel cam. During a portion of each indexing cycle, then, the follower member undergoes successive steps of acceleration, steady-state angular motion, and deceleration together constituting a drive period in which the follower member is advanced through an angle of fixed magnitude determined by the configuration of the cam rib 19; the remainder of the indexing cycle constitutes a dwell period during which the follower member is held stationary. In this manner, continuous unidirectional rotation of the cam 14 produces intermittent unidirectional rotation of the follower 16 in a succession of drive periods of predetermined magnitude with intervening stationary dwell periods of predetermined duration.

Since the device 10 is, as stated, a conventional indexing unit, further details of the construction and operation thereof will be readily apparent to those skilled in the art and accordingly need not be herein described.

The device 11 is essentially identical to the device 10. It includes a rotatable barrel cam 22 mounted on a shaft 24 and bearing a peripheral cam track (e.g., a raised tapered rib 25) engaging successive rollers 26 of a rotatable roller gear follower member 27 mounted on a shaft 28, for imparting intermittent rotary motion (e.g., unidirectional motion) to the member 27 in correspondence with continuous unidirectional rotary motion of the cam 22. The diameters of the cam 22 and follower member 28 are respectively the same as the diameters of the corresponding elements of the device 10, and the portion of the rib 25 which imparts steady-state angular motion to the follower member 27 is so shaped that, when the cam 22 is rotating at the same angular velocity as cam 14, the steady-state angular velocities of the follower members 16 and 27 (i.e., during their respective drive periods) will be at least substantially equal to each other. The two devices may have output drive periods of equal magnitude; alternatively, the rib 25 may be adapted to impart to the follower member 27 a greater or lesser angular displacement during each drive period than is imparted to the follower member 16 by cam rib 19, i.e., the magnitude of the output drive period of the device 11 may be greater or lesser than that of the device 10.

The devices 10 and 11 are mounted in adjacent side-by-side relation with the axes of rotation of their respective barrel cams 14 and 22 parallel to each other, and their respective follower members 16 and 27 disposed for rotation about a common axis along which the follower member shafts 17 and 28 extend, the facing ends of these shafts being spaced apart. The cam ribs of the two devices are so oriented relative to each other that when the barrel cams 14 and 22 are rotated in opposite directions, about their respective axes, the follower members 16 and 27 are both driven in the same direction about the common axis of follower member rotation.

The barrel cam shaft 15 of the indexing device 10 is adapted to be connected to a suitable input shaft (not shown), i.e., the shaft of an input drive mechanism for imparting to the shaft 15 and barrel cam 14 continuous unidirectional rotary motion. This input motion is transmitted to the barrel cam shaft 24 of the device 11 by a pair of spur gears 30 and 31 having a one-to-one gear ratio and disposed in meshing relation for rotation, respectively, about the rotational axes of the barrel cams 14 and 22. Gear 30 is keyed to the shaft 15 of cam 14 for rotation therewith, so as to be driven directly by the input shaft. Gear 31, which is driven by gear 30 at the same angular velocity as gear 30 but in an opposite direction, is secured by bolts 32 to a drive plate 34 keyed to the shaft 24 of cam 22. Consequently, whenever rotary input motion is imparted to the shaft 15, the two cams 14 and 22 are driven simultaneously at equal angular velocities but in opposite directions about their respective axes, and effect intermittent rotary motion of the two follower members 16 and 27 about the common follower member axis in a common direction, at equal steady-state angular velocities.

The drive plate 34 and gear 31 are in face-to-face engagement, being secured to each other (as stated) by the bolts 32, which project through arcuate slots 35 formed in the drive plate. The gear 31 is not keyed to the shaft 24, and hence when the bolts 32 are loosened, the shaft 24, cam 22 and drive plate 34 may be turned together relative to the gear 31 about their axis of rotation. The slots 35 are shaped to permit such turning of the drive plate (together with shaft 24 and cam 22) relative to the gear 31, through a limited angular range. Thus the angular orientation of the drive plate and cam 22 relative to gear 31 may be changed (within the range of angular positions permitted by slot 35) by loosening the bolts 32, turning the drive plate relative to the gear 31, and re-tightening the bolts to secure the drive plate again to the gear in the selected new angular position.

By virtue of the described arrangement of the drive plate 34 and gear 31, the time relation between the initiation of drive periods of the two follower members 16 and 27 may be varied. As will be understood, this time relation is determined by the relative angular orientation of the two cam ribs 19 and 25 about the respective axes of rotation of the cams 14 and 22. That is to say, if the acceleration-imparting portions of the two ribs are in such relative angular positions as to engage the rollers of the respective follower members simultaneously (during continuous rotation of the two cams), the drive periods of the two follower members will accordingly be initiated simultaneously. If, however, cam 22 is turned about its axis while the other is held stationary so that the accelerating-imparting portion of the rib 25 engages a roller of the follower member 27 earlier or later than the acceleration-imparting portion of the rib 19 of cam 14 engages a roller of the follower member 16, the drive period of the two follower members will be initiated at different times, the interval between the initiations of the two drive periods being determined by the difference in angular orientation of the two cam ribs and being precisely repeated in each indexing cycle as long as that difference remains fixed. In the described structure, the relative angular orientations of the cam 14, gear 30 and gear 31 are fixed by the keying of gear 30 on the shaft of cam 14 and the meshing of gear 31 with gear 30. Accordingly, angular displacement of the drive plate 34 relative to the gear 31 causes the cam 22 to be changed in angular orientation relative to cam 14 and thereby effects change in relative angular orientation of the acceleration-imparting portions of the ribs of the two cams so as to vary the times of initiation of the drive periods of the two follower members.

A pair of clutch plates 37 and 38 are respectively mounted on the facing ends of the two follower member shafts 17 and 28, for rotation therewith. These clutch plates are disposed in facing spaced relation to each other and have planar facing surfaces perpendicular to the common axis of follower member rotation. Each of the clutch plates has a plurality of holes 40 spaced around the plate at localities equidistant from the last-mentioned rotational axis, these holes are axially parallel to that axis, and open through the facing surfaces of the clutch plates. Between the two clutch plates there extends a short shaft 42, coaxial with the follower shafts 17 and 28 and journalled at its ends in sockets in the clutch plates so as to permit rotation of the clutch plates relative to the shaft 42.

A spur gear 44 is journalled on shaft 42 intermediate the two clutch plates, so as to be rotatable relative to the clutch plates about the common axis of follower member rotation. The spur gear 44 is also freely slidable along the shaft 42 between the clutch plates. Gear 44 bears an eccentrically disposed pin 45 having opposite ends respectively projecting from the gear toward the two clutch plates. Each end of the pin is positioned and dimensioned to be receivable in any of the holes 40 of the clutch plate toward which it projects, and has a rounded extremity to facilitate its insertion in those holes.

The length of pin 45 is such that when gear 44 is moved along shaft 42 into its proximate position in relation to either of the clutch plates, and the end of the pin projecting toward that clutch plate is fully inserted in one of the holes 40 thereof, the other end of the pin is spaced away from engagement with the other clutch plate. Full insertion of a projecting end of the pin in the hole 40 if either clutch plate provides a positive engagement between that clutch plate and the gear 44 and thereby causes rotary motion of the engaged clutch plate to be imparted to the gear 44. Since the pin is then out of engagement with the other clutch plate, the gear 44 will rotate in correspondence with rotation of the engaged clutch plate regardless of whether the other clutch plate is rotating or stationary.

The gear 44 may be shifted from engagement with one clutch plate into engagement with the other clutch plate whenever holes 40 of both clutch plates are in register with the pin 45 and the difference in angular velocities between the two clutch plates is zero. For example, assuming that the gear 44 is in proximate relation to clutch plate 37, with the pin 45 inserted in a hole 40 of clutch plate 37, with both follower members (and consequently both clutch plates) stationary, and further assuming that a hole 40 of the clutch plate 38 is in register with the end of pin 45 projecting toward the latter clutch plate, gear 44 may be shifted out of engagement with clutch plate 37 and into engagement with clutch plate 38 by translation along the shaft, the pin 45 being thereby freed from clutch plate 37 and inserted in a hole of the clutch plate 38. Again, if the two follower members are both being rotated by the respective cams at steady-state angular velocity, and if a hole 40 of the clutch plate 37 is in register with the projecting free end of pin 45, the gear 44 may be shifted out of engagement with the clutch plate 38 and back into engagement with the clutch plate 37 by translation along the shaft 42, since the steady-state angular velocities of the two follower members are, as stated, equal. Preferably, the pin 45 is sufficiently long so that during translation of the gear 44 from one clutch plate to the other, the pin engages a hole of the clutch plate toward which it is moving before becoming disengaged from a hole of the first clutch plate, being thus always in engagement with at least one of the clutch plates and (at an intermediate stage in translation of the gear) briefly in engagement with both.

Translation of the gear 44 from one clutch plate to the other is effected by means of a fork 47 positioned at one side of the gear 44 which prongs 48 slidably engaging the opposite faces of that gear. The fork is mounted on a rod 49 which extends in parallel relation to the common axis of rotation of the follower members and has opposite ends slidably received in sockets of support structure 49a so as to be capable of axially directed reciprocating motion.

A pair of disc cams 50 and 51 are respectivey keyed on the two parallel cam shafts 15 and 24 for rotation therewith in adjacent relation to the rod 49. The rod bears a pair of follower rollers 53 and 54 respectively positioned to be engaged by cams 50 and 51. The cam 50 is so shaped and oriented in relation to the rib 19 of barrel cam 14 that at a predetermined point in each indexing cycle of the follower member 16 the engagement of a projecting portion of the cam 50 with the roller 53 effects axial movement of rod 49 (and corresponding movement of fork 48) in such direction as to cause translation of the gear 44 away from engagement with the clutch plate 38 and into engagement with the clutch plate 37. Similarly, cam 51 is so shaped and oriented in relation to the rib 25 of barrel cam 22 that at a predetermined point in each indexing cycle of the follower member 27 engagement of a projecting portion of cam 51 with follower 54 moves the rod and fork in the opposite direction, shifting the gear 44 away from engagement with clutch plate 37 and into engagement with clutch plate 38. The orientations of the projections of the two disc cams 50 and 51 relative respectively to the barrel cams 14 and 22 are such that the alternate shifting of the gear 44 back and forth between the two clutch plates occurs at times at which the difference in angular velocity between the two clutch plates is zero—i.e., at times when both follower members are either simultaneously rotating at steady-state angular velocity (or at least at velocities sufficiently close to permit gear-clutch plate engagement) or simultaneously stationary. Since cam 51 is keyed on shaft 24, it turns with shaft 24, cam 22 and drive plate 34 when these elements are turned relative to gear 31 to change the phase relationship of the two follower member drive periods as described above.

The spur gear 44 meshes with a further spur gear 56 (dimensioned to provide a one-to-one gear ratio with gear 44) which is keyed on the output shaft 12. Thus the rotary motion imparted to gear 44 by either clutch plate is transmitted to the ouput shaft. As shown, the thickness of gear 56 is sufficient, in relation to the path of translational movement of gear 44, so that as the gear 44 is shifted back and forth between the two clutch plates it remains continuously in meshing relationship with the gear 56.

Figure 4A:
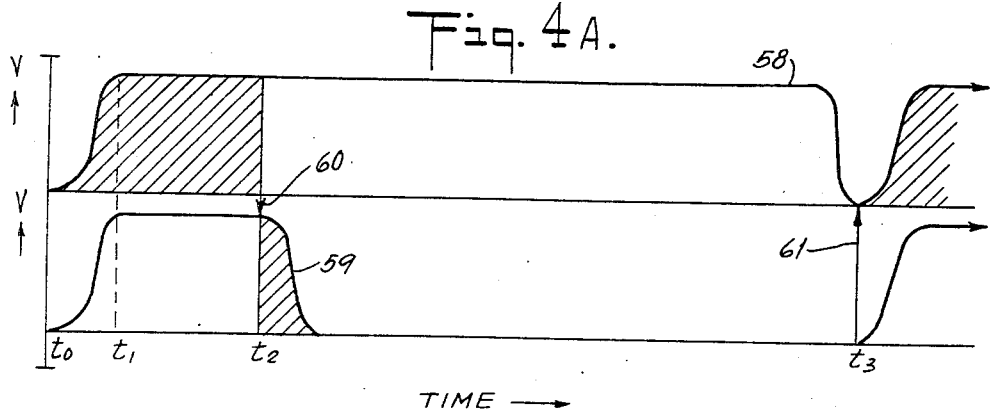
FIG. 4A, 4B and 4C are graphs wherein output velocity of each of the indexing devices in the apparatus of FIG. 1 is plotted against time, for various output phase relationships of the two devices, illustrating certain examples of operation when one of the devices is a one-stop indexing device and the other is a three-stop indexing device.
Figure 4B:
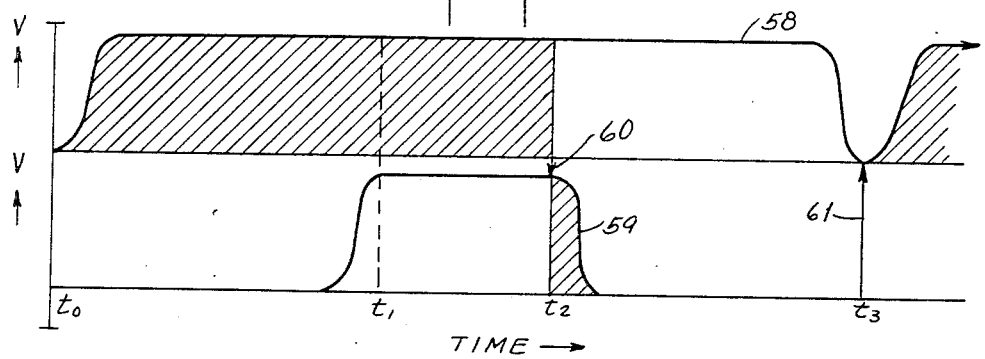
Figure 4C:
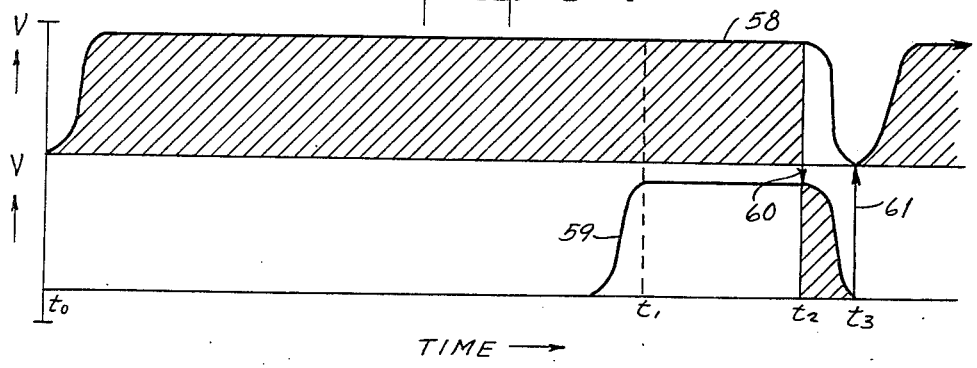

The operation of the apparatus of FIGS. 1–3 may be illustrated by reference to a specific example of such apparatus in which the indexing device 10 is a one-stop indexing device, the device 11 is a three-stop indexing device, and the clutch plates 37 and 38 each have three holes 40 spaced 120° apart around the common axis of follower member rotation to enable the apparatus to be set to provide any of three magnitudes of output shaft drive period: 120°, 240° and 360°. FIGS. 4A, 4B and 4C are graphs respectively showing the angular velocities of the follower members of the two devices (plotted against time) for each of these output shaft drive periods. In these figures, the shaded portion of the area under the curve for each follower member drive period represents the output shaft displacement effected by that drive period.

In each of FIGS. 4A, 4B and 4C, the time interval from $t_0$ to $t_3$ represents the duration of one indexing cycle. Since the device 10 is a one-stop device, i.e., having a single stop position for the follower member 16, this follower member (together with its shaft 17 and clutch plate 37) rotates through a full 360° during each indexing cycle. From curve 58, which represents the angular velocity of the follower member 16, it will be apparent that at the start of each indexing cycle the member 16 is accelerated from zero velocity to a steady-state angular velocity, and is driven continuously at the latter velocity until the end of the indexing cycle approaches, being then decelerated back to zero velocity so as to have a momentary stationary dwell at its stop position.

The follower member 27 of the device 11, having three stop positions for each complete revolution, is driven through 120° during a part of each indexing cycle and is held stationary during the remainder of the cycle. Thus three cycles are necessary to effect one full revolution of member 27. As indicated by curve 59, which represents the angular velocity of member 27, the member 27 is initially accelerated from zero velocity to a steady-state angular velocity (this being the same as the steady-state angular velocity of the member 16 of device 10) and then decelerated back to zero velocity so as to become stationary when it has rotated 120°.

To provide the operation illustrated graphically in FIG. 4A, the drive plate 34 is set (in relation to gear 31) so that acceleration of the member 27 by barrel cam 22 is initiated simultaneously with acceleration of the member 16 by barrel cam 14, in each indexing cycle. At the start of each cycle, the three holes 40 of clutch plate 37 are in register with the three holes 40 of clutch plate 38, and spur gear 44 is in engagement with clutch plate 37, pin 45 being inserted in one of the holes 40 of the latter plate, so that the output shaft 12 is initially driven by the follower member 16.

With continuous unidirectional rotary motion of constant angular velocity imparted to the two barrel cams 14 and 22, both follower members 16 and 27 begin to accelerate at time $t_0$. At time $t_1$, both follower members have rotated through 30° and have attained their steady-state angular velocity; since they are both rotated in the same direction, holes 40 of the two clutch plates are still in register, and remain in register as long as they both continue to move at steady-state velocity, e.g., until time $t_2$ at which point both follower members have turned through 90°.

At any time during the interval from $t_1$ to $t_2$, the spur gear 44 may be shifted by fork 47 away from engagement with clutch plate 37 and into engagement with clutch plate 38, the pin 45 being received in a hole 40 of plate 38. Such shifting is possible because the holes of the two clutch plates are in register and the clutch plates are turning in the same direction at the same steady-state angular velocity. Shifting of the gear 44 is effected when the projecting portion of disc cam 51 is rotated into engagement with follower 54 carried by rod 49 to cause translational movement of the fork 47 toward the clutch plate 38. The cam 51, mounted on shaft 24, is so oriented relative to barrel cam 22 that this shifting action (represented by arrow 60 in FIG. 4A) occurs while the follower member 27 is in the steady-state portion of its drive period.

As and after the spur gear 44 is shifted, gear 55 and output shaft 12 continue to be driven thereby at the same steady-state angular velocity, but are now coupled to the clutch plate 38 connected to follower member 27. Accordingly, when member 27 is decelerated and halted after accomplishing 120° of revolution, shaft 12 is correspondingly halted, having been driven (first by follower member 16, and then by follower member 27) through 120°. During the remainder of the indexing cycle, the output shaft continues to be coupled to the clutch plate 38 and thus remains stationary, while follower member 16 and clutch plate 37 continue to rotate.

The disc cam 50 is so oriented on shaft 15, relative to the barrel cam 14, that its projection is rotated into engagement with the follower 53 of rod 49 just as the follower member 16 decelerates to zero velocity at the end of the indexing cycle. At this point the two follower members (and hence the two clutch plates) are both momentarily stationary. Clutch plate 38 has been displaced 120° from its position at the start of the first indexing cycle, while clutch plate 37 has been turned through a full 360° back to its initial position; consequently the holes of the two clutch plates are once again in register, and as the engagement of cam 50 with follower 53 moves the fork 47 to shift the spur gear 44 away from engagement with clutch plate 38 and back toward clutch plate 37, the pin 45 is re-inserted in a hole 40 of plate 37 so as to recouple the output shaft 12 to the follower member 16 for the start of the next indexing cycle. This return of gear 44 to plate 37 is represented by arrow 61 in FIG. 4A.

Consequently, with the drive plate 34 positioned to orient the barrel cam 22 (in relation to barrel cam 14) so as to provide the phase relationship between follower member drive periods shown in FIG. 4A, the drive period of output shaft 12 rotates shaft 12 through 120° during each indexing cycle, and these indexing cycles are repeated continuously as long as continuous rotary input drive it imparted to the two barrel cams.

By loosening the bolts 32, turning the drive plate 34 (and hence rotating the barrel cam 22) through an appropriate angle relative to gear 31, and retightening the bolts, the angular orientation of cam 22 in relation to barrel cam 14 may be changed to provide the phase relationship between follower member drive periods illustrated graphically in FIG. 4B. In the operation represented by FIG. 4B, as before, the holes 40 of the two clutch plates are initially in register, and the output shaft 12 is initially coupled to the clutch plate 37 through spur gear 44 so that it begins to be driven by follower member 16 at time $t_0$. Owing to the changed orientation of barrel cam 22, the follower member 27 is initially stationary; i.e., the start of its drive period is retarded relative to the start of the drive period of follower member 16, so that at time $t_1$, member 27 has moved through 30° and has attained steady-state angular velocity, while member 16 has rotated through 150°. Thus, at $t_1$, clutch plate 37 has been displaced 120° with respect to clutch plate 38; since the clutch plate holes 40 are spaced 120° apart, the three holes of plate 37 are once more in register with those of plate 38. Until time $t_2$, when it has been displaced 90°, member 27 continues to rotate at steady-state angular velocity, and throughout this period member 16 is of course also rotating in the same direction at the same velocity, having been displaced 210° when time $t_2$ is attained. Therefore, the spur gear 44 may be shifted from clutch plate 37 to clutch plate 38 at any time during the interval $t_1 - t_2$, the switching being effected by engagement of the projecting portion of disc cam 51 with the follower 54.

In the structure shown, the orientation of cam 51 is fixed relative to barrel cam 22, and is accordingly changed with cam 22 (relative to gear 31) when the position of drive plate 34 is reset as described. As a result, shifting of the gear 44 from clutch plate 37 to clutch plate 38 is effected at the same point in the drive period of member 27 as is the operation represented by FIG. 4A, and is again represented (in FIG. 4B) by arrow 60.

After gear 44 is shifted, the output shaft 12 continues to rotate, being now driven by follower member 27 through clutch plate 38, and is decelerated to zero velocity when follower member 27 decelerates to complete its 120° indexing movement. Thereafter, shaft 12 remains coupled to member 27, and is held stationary therewith, until the end of the indexing cycle (time $t_3$), at which time the gear 44 is shifted again (arrow 61) back into engagement with plate 37 for the start of the next indexing cycle, i.e., by engagement of the projection of disc cam 50 with follower 53 while the follower member 16 is momentarily stationary, member 27 then being also stationary.

In the operation represented by FIG. 4B, the output shaft is rotated through at least 150° during each indexing cycle by follower member 16, and then continues to rotate through a further 60° at steady-state velocity, while gear 44 is shifted to clutch plate 38. At time $t_2$, then, the output shaft is coupled to follower member 27, and has rotated through 210°. After time $t_2$, member 27 turns through a further 30° to complete its 120° displacement. Consequently, in the FIG. 4B operation, the output shaft drive period effects a 240° displacement of shaft 12 during each drive period.

The angular orientation of cam 22 relative to cam 14 may be still further changed (by appropriate resetting of the angular position of drive plate 34 relative to gear 31) to provide the phase relationship between follower member drive periods represented by FIG. 4C. In FIG. 4C, the drive period of follower member 27 (velocity curve 59) is retarded 240° with respect to that of follower member 16; i.e., at time $t_1$, member 27 has advanced 30° and attained steady-state angular velocity while member 16 has advanced 270°. Once again, gear 44 initially couples the output shaft 12 to follower member 16 through clutch plate 37, and is shifted to clutch plate 38 during the interval $(t_1-t_2)$ at which both follower members are being driven at steady-state angular velocity. Shaft 12 is then coupled to follower member 27, and decelerated therewith to attain zero velocity at time $t_3$, the end of the indexing cycle, having thus been driven through a full 360°. The gear 44 is shifted back to the clutch plate 37 at $t_3$, while both clutch plates are stationary.

Figure 5A:
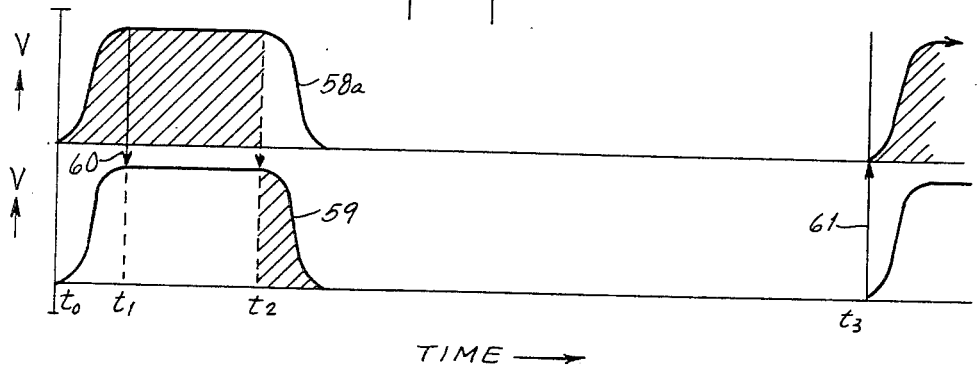
FIGS. 5A and 5B are graphs similar to FIGS. 4A and 4B, illustrating certain examples of operation when both devices are three-stop indexing devices.
Figure 5B:
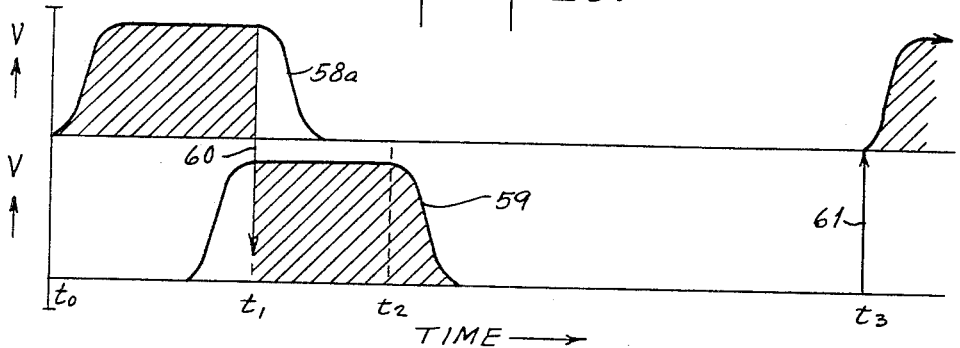
Figure 6:
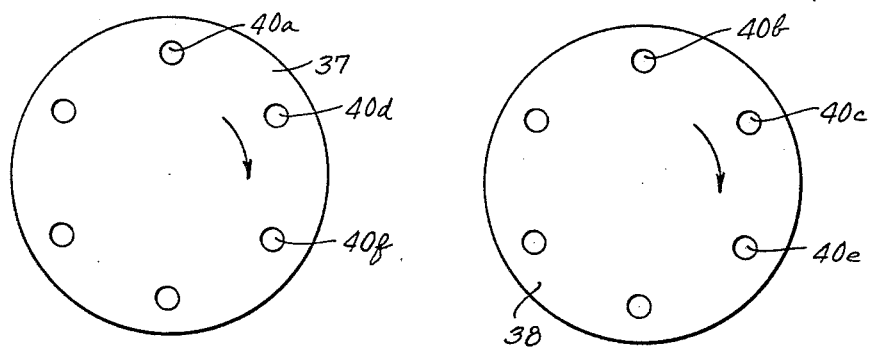
FIG. 6 is a view of the two clutch plates of apparatus as shown in FIGS. 1-3 having two three-stop indexing devices and adapted to provide operation as represented by the graph shown in FIG. 5B.

As a further example of operation of the apparatus of FIGS. 1–3, reference may be made to FIGS. 5A and 5B which are graphs similar to FIGS. 4A and 4B but illustrating operation of the apparatus in an embodiment in which both indexing devices 10 and 11 are three-stop indexing devices, i.e., in which the drive period of each of the follower members 16 and 27 effects follower member angular displacement of 120° during each indexing cycle. In this embodiment, each of the clutch plates 37 and 38 has six holes 40 spaced 60° apart around the common axis of follower member rotation, as shown in FIG. 6.

To provide the operation represented by FIG. 5A, the barrel cam 21 is so oriented relative to barrel cam 14 (by appropriate positioning of the drive plate 34 relative to gear 31) that the drive periods of the two follower members 16 and 27 are initiated simultaneously, the angular velocities of these two follower members being respectively represented by curves 58a and 59. The indexing cycle extends from time $t_0$ to time $t_3$. With continuous constant-velocity unidirectional rotary input motion imparted to the two barrel cams, both follower members simultaneously begin to accelerate at time $t_0$; at time $t_1$ both have turned through 30° and attained steady-state angular velocity, which continues until time $t_2$. Thereupon both follower members decelerate to zero velocity, each having undergone an angular displacement of 120°, and remain stationary until the beginning of the next indexing cycle.

At the start of each indexing cycle, the output shaft 12 is coupled by gear 44 through clutch plate 37 to follower member 16, the holes of the two clutch plates being in register with each other. Throughout the indexing cycle the clutch plate holes remain in register, since the two follower members have simultaneous drive periods of equal magnitude. At time $t_1$, cam 51 moves follower 54 to cause the fork 47 to shift gear 44 into engagement with clutch plate 38, as indicated by arrow 60. Thereafter (e.g., at time $t_3$) cam 50 moves follower 53 to effect shifting of the gear 44 back into engagement with clutch plate 37 (arrow 61) for the next indexing cycle. The output shaft drive period accordingly effects indexing of the shaft 12 through 120° during each cycle.

FIG. 5B represents operation of the apparatus with the drive plate position changed to retard the drive period of follower member 27 by 60° relative to that of member 16. The gear 44 is in engagement with the clutch plate 37 at the start of the indexing cycle (time $t_0$), at which time the follower member 16 begins to accelerate and to drive the output shaft 12. Thereafter, follower member 27 begins to accelerate, at such time that when the member 16 has turned through 90° (time $t_1$), the member 27 has turned through 30° and has attained steady-state angular velocity. At $t_1$, member 16 is still being driven at steady-state velocity (and thereafter continues to turn through another 30° before stopping), and cam 51 moves follower 53, rod 49 and fork 47 to shift the gear 44 into engagement with the clutch plate 38 (as indicated by arrow 60). Member 27, which is now coupled through plate 38 and gear 44 to drive the output shaft, indexes through another 90° and stops, the output shaft also remaining stationary throughout the rest of the indexing cycle. Consequently, the output shaft is advanced through a total of 180° during each output shaft drive period. The gear 44 is shifted back to clutch plate 37 (arrow 61) by cam 50 during the concurrent portions of the stationary dwell periods of the two follower members, e.g., at time $t_3$.

The operation represented by FIG. 5B may be further understood by reference to FIG. 6, which shows the two clutch plates 37 and 38 (each having six holes 40 spaced 60° apart) side by side for convenience of illustration. At the start of an indexing cycle, the holes of the two clutch plates are in register and the pin 45 is inserted in a hole (e.g., hole 40a) of plate 37. Hole 40a is initially in register with hole 40b in clutch plate 38. At time $t_1$ in FIG. 5B, hole 40a has rotated 90° clockwise as seen in FIG. 6, while hole 40c (spaced 60° clockwise from hole 40b in plate 38) has rotated through 30°; thus holes 40a and 40c are in register, and the described shifting of gear 44 transfers the pin 45 into hole 40c of plate 38. Hole 40a of plate 37 rotates through another 30° (a total of 120° from its initial position shown in FIG. 6) and stops. Hole 40c of plate 38 rotates through an additional 90° from its position at time $t_1$ and stops. Hole 40c is then in register with hole 40 of plate 37, the latter hole being spaced 60° clockwise from hole 40a. Accordingly, when the gear 44 shifts back to plate 37 at time $t_3$, the pin 45 is inserted in hole 40d, recoupling the output shaft to follower member 16 for the start of the next indexing cycle.

In the succeeding cycle, the pin is shifted from hole 40d in plate 37 to hole 40e (spaced 60° clockwise from hole 40c) in plate 38, and then back to hole 40f (spaced 60° clockwise from hole 40d) in plate 37. In this manner, during successive cycles, the pin alternately engages successive holes in the two clutch plates.

As will be apparent from the foregoing specific examples, the operation of the apparatus of FIGS. 1–3 involves, in each indexing cycle, successive coupling of the output shaft to each of the two follower members 16 and 27, the output shaft being initially coupled to those of these follower members and the gear 44 being shifted between the clutch plates so as to couple the output shaft to the other follower member at a time at which both follower members are being driven at steady-state angular velocity. Thereafter, in the same indexing cycle, the gear 44 is shifted back to the first clutch plate (to recouple the output shaft to the first follower member, for the start of the next cycle) at a time at which both follower members are stationary. Thus the output shaft drive period commences at the beginning of the drive period of the first-coupled follower member and terminates at the end of the drive period of the second coupled follower member. The magnitude of this output shaft drive period (expressed as angular displacement of the output shaft, assuming a one-to-one gear ratio coupling of the output shaft to the follower members) is determined by the magnitudes of the individual drive periods of the two follower members, the time relation between the initiation of these two drive periods in each indexing cycle, and the order in which the output shaft is successively coupled to the follower members.

In the examples of operation described above, the magnitude of the output shaft drive period may be varied to provide indexing of 120°, 240° or 360° (in the case of FIGS. 4A–4C) or to provide indexing of 120° or 180° (in the case of FIGS. 5A or 5B) by appropriate angular positioning of the drive plate 34 relative to the gear 31, i.e., by effecting change in the phase relationship of the individual drive periods of the two follower members.

In each instance of operation, the output shaft is accelerated by one of the indexing devices and decelerated by the other, and the magnitude of each selected indexing period is precisely fixed by the individual magnitudes of the two follower member drive periods, the angular orientation of drive plate 34 relative to gear 31, and the positive meshing engagement of the two gears 30 and 31.

Accordingly, the apparatus provides the advantages of variable magnitude output drive periods with high precision indexing.

It will further be apparent from the foregoing specific examples of operation that the number of alternative choices of output shaft drive period magnitude afforded by apparatus as shown in FIGS. 1–3 is determined by the magnitudes of the individual follower member drive periods and by the number and spacing of the holes 40 in the two clutch plates. Thus a larger number of alternative values of output drive period can be provided, in any given apparatus, by increasing the number of appropriately positioned holes in the clutch plates. The number and position of the clutch plate holes must be such as to satisfy the requirement, for each desired magnitude of output drive period, that the holes of the two clutch plates are in register during both the overlapping steady-state velocity portions of the two follower member drive periods, and the overlapping portions of the setationary dwell periods of the two follower members.

Thus, while FIGS. 4A–C and 5A–B represent illustrative specific combinations of follower member drive periods of given individual magnitudes, providing a particular selection of output drive periods, different combinations of these follower member drive periods (providing output drive periods of different magnitude) are possible, and still further different output drive periods may be achieved by utilizing indexing devices having follower member drive periods of magnitudes other than those represented in FIGS. 4A–C and 5A–B.

The positive pin and hole clutching engagement between plates 37, 38 and gear 44 in the apparatus of FIGS. 1–3, though limiting the selection of output drive period magnitude to a choice of incrementally differing values, affords the advantage of preventing minor errors in phase setting (i.e., errors in phasing of the two indexing devices) from having a cumulative effect on the indexing of the output shaft. If the positioning of drive plate 34 differs slightly from that which would provide a desired phase relation between the drive periods of the two follower members for selected output shaft indexing operation, the holes of the two clutch plates will be slightly out of register at times at which the gear 44 is shifted from one to the other. However, the rounded shape of the extremities of pin 45 enables the pin to accommodate such slight misalignments and to slide into a slightly off-register hole with corresponding minor movement of gear 44. If this movement is forwardly directed as the pin shifts from plate 37 to plate 38, i.e., if the holes of plate 38 lead those of plate 37 slightly, then upon the return shift of the pin back to the plate 37, a slight retrograde motion of the gear 44 (and hence of output shaft 12) will be produced, so that the effect of the phase error on the position of the output shaft, during successive indexing cycles, is not additive.

As an alternative to the pin-and-hole clutching arrangement of FIGS. 1 and 3, a tooth clutch arrangement may be employed, again affording positive clutching engagement between the gear 44 and each of the clutch plates 37 and 38 and preventing slight errors in phasing from having an additive effect on the output shaft position but enabling selection of output drive magnitude from a larger number of incrementally differing values. The teeth on the respective clutch elements may be bevelled to provide the same advantage, with respect to accommodation of minor phase errors, as the rounded shape of the ends of pin 45 discussed above.

Figure 7:
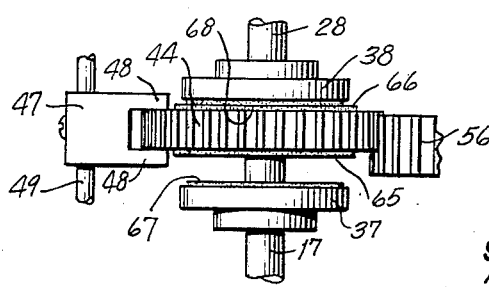
FIG. 7 is a fragmentary plan view of an alternative embodiment of the invention.

As a further alternative, a friction clutch may be substituted for the pin-and-hole clutch arrangement of FIGS. 1 and 3. An example of such a friction clutch arrangement is illustrated in FIG. 7. As there shown, the gear 44 bears on its opposed faces friction surfaces 65 and 66, respectively positioned to engage friction surfaces 67 and 68 provided on the respective clutch plates 37 and 38.

When the gear 44 is moved by fork 47 into proximate relation to plate 37, the friction surfaces 65 and 67 engage to transmit rotary motion from follower member 16 through gears 44 and 56 to the output shaft; similarly, when the gear 44 is shifted by fork 47 to plate 38, the surfaces 66 and 68 engage to trasmit rotary motion from the follower member 27 to the output shaft through gears 44, 56.

The use of a friction clutch permits infinite variation in the magnitude of the output shaft drive period since shifting does not require register between a pin and holes or between clutch teeth of the engaging clutch elements. However, if the load on the output shaft exceeds the load-carrying capacity of the friction clutch, desired precision of indexing may be lost through slippage of the clutch elements during periods of acceleration and deceleration. Also, if the phase relationship of the two indexing devices differs slightly from that desired, the effect of the phase error on output shaft position is cumulative during successive indexing cycles. To compensate for such error, means may be provided for sensing errors in output shaft indexing, and for adjusting the setting of the phase relationship of the two indexing devices in response to sensed errors.

While the apparatus of the invention has been described as having disc cams 50 and 51 fixed in position relative to the barrel cam shafts 15 and and 24 with which they respectively rotate so that shifting of the gear 44 between the clutch plates occurs in fixed time relationship to the drive periods of the follower members respectively driven by the barrel cams 14 and 22, the disc cams may be made adjustable in position relative to the barrel cams so as to enable variation in this time relationship.

A modified embodiment of the invention, incorporating a still further alternative form of clutching arrangement, is shown in FIG. 8. This embodiment again incorporates two indexing devices 10 and 11 each comprising a cylindrical barrel cam and a roller gear follower member which is displaced through a predetermined angle during each revolution of the barrel cam. In the apparatus of FIG. 8, the two barrel cams 14 and 22 of the respective indexing devices 10 and 11 are disposed for rotation about a common axis and in place of the two barrel cam shafts 15 and 24 there is provided a single input shaft 70 which is connected to the shaft of an input drive mechanism (not shown) for imparting to shaft 70 continuous unidirectional rotary motion. The barrel cam 14 of the device 10 is secured to the shaft 70 for rotation therewith. The shaft 70 extends through the barrel cam 22 of the device 11, along the axis of rotation of cam 22, but is rotatable relative to the latter cam. A slotted drive plate 72, similar to the drive plate 34 of the apparatus of FIGS. 1–3, is carried by the shaft 70 in abutting relation to one end of the cam 22 and is secured to the cam 22 by bolts 73 which project through arcuate slots (not shown) formed in the drive plate. As thus connected, the drive plate imparts the rotary motion of the shaft 70 to the barrel cam 22. However, when the bolts 73 are loosened, the barrel cam may be turned relative to the drive plate and shaft 70 to adjust the phase relationship between the output indexing cycle of the device 11 and that of the device 10, being secured again to the drive plate in the desired new position by retightening the bolts.

The follower members 16 and 27 of the two devices 10 and 11 in the FIG. 8 apparatus rotate about parallel axes and thus the shafts 17 and 28 on which they are respectively mounted are axially parallel. The follower member shaft 17 of the device 10 carries a spur gear 75 which rotates with the follower member and shaft 17; a similar spur gear 76 of identical diameter and tooth spacing is secured to the follower member shaft 28 of the device 11 for rotation therewith. The gear 76 is offset with respect to the gear 75, i.e., the planes of rotation of these two spur gears are spaced apart, as shown in FIG. 8.

An output shaft 78 is positioned between and in parallel relation to the follower member shafts 17 and 28 of the two indexing devices. A further spur gear 80 is splined on the shaft 78 so as to be axially displaceable relative to shaft 78 while being at all times in driving engagement with shaft 78. Specifically, the output gear 80 is selectively engageable with either of the spur gears 75 and 76 so as to be driven by either one or the other of these gears, and is displaceable from engagement with one of the latter gears into engagement with the other by sliding motion along shaft 78. It will be understood that the spacing of the two follower member shafts 17 and 28 is such as to permit meshing engagement of gear 80 with either of gears 75 or 76 depending on the axial position of the gear 80 along the shaft 78; the spacing between the planes of rotation of the two gears 75 and 76 is such that the gear 80 may be in meshing engagement with either one of them and out of engagement with the other.

The operation of the apparatus of FIG. 8 is generally as described above with reference to the apparatus of FIGS. 1–3, except that the selective coupling of the output shaft to the follower members of the two indexing devices is effected by means of the alternate meshing engagement of the gear 80 (which drives shaft 78) with the two gears 75 and 76 respectively carried by the follower member shafts of the two indexing devices, and the shifting clutch action is effected by sliding the gear 80 axially along shaft 78 from engagement with one of the gears 75, 76 into engagement with the other of gears 75, 76 at times at which the difference in angular velocities of the two follower members is zero—in other words, at times when both follower members are stationary or when both follower members are being driven at steady state angular velocity. As will further be appreciated, the cam tracks of the two barrel cams 14 and 22 are so oriented as to rotate the follower members in the same direction about their respective axes to enable such shifting to be effected when both follower members are being driven at steady state angular velocity.

As in the case of the embodiments of FIGS. 1–3 and 7, the axial displacement of the output gear 80 may be effected by means of a fork which engages the gear 80 and undergoes reciprocating motion along a path parallel to the axis of shaft 78 at predetermined times during each output cycle, being thus displaced by a suitable arrangement of cams carried by the input shaft 70. For simplicity of illustration, the fork, cams and connecting elements are omitted from FIG. 8.

Alternative means for varying the phase relationship of the two indexing devices in the embodiments of the invention described above may be used in place of the drive plates 34 (FIGS. 1–3) and 72 (FIG. 8). One such alternative arrangement, as employed in the apparatus of FIGS. 1–3, is shown in FIG. 9. In this arrangement, the gear 31 carries a bracket 82 in which there is journalled a worm 83 disposed in offset relation to the barrel cam shaft 24. This worm meshes with a gear 84 carried by shaft 24 so that rotary motion of gear 31 is transmitted through the worm 83 to the gear 84 and thus to shaft 24. A handle 86 is connected to the worm 83 to permit the worm to be rotated manually about its axis. Such rotation of the worm effects angular displacement of the gear 84 and barrel cam 22 (not shown in FIG. 9) connected to the shaft 24 so as to change the phase relationship between the indexing cycle of device 11 and that of device 10, i.e., by changing the angular orientation of the barrel cam 22 relative to barrel cam 14. The gear ratio of the worm and worm gear is fixed so that a given amount of rotation of the worm results in a fixed displacement of the phasing cam 22, i.e., a fixed increment of adjustment in the output shaft drive period.

The invention may also be embodied in apparatus wherein the follower member drive period of one or both indexing devices effects successive forward and reverse motion of the follower member, or includes acceleration of the follower member to (and deceleration from) a maximum velocity greater than the steady-state angular velocity referred to above, or drive of the follower member at some other velocity different from the steady-state angular velocity, as long as the two follower members are rotated in a given direction at substantially equal steady-state angular velocities during at least some portion of their respective drive periods. Merely by way of illustration, two specific examples of such operation are srown in FIGS. 10 and 11. FIG. 10 is a graph (similar to FIGS. 4A and 5A) showing the angular velocities of the follower members of the two devices 10 and 11 plotted against time illustrating operation of an embodiment of the invention in which the barrel cam rib of the device 11 is shaped to provide both forward and reverse rotary motion of the follower member 27 during each drive period, and FIG. 11 is another similar velocity-time graph illustrating operation of an embodiment of the invention in which the barrel cam rib of the device 10 is shaped to effect initial acceleration of the follower member 16 to an angular velocity greater than that of the aforementioned steady-state angular velocity.

In FIG. 10, the interval $t_0$–$t_3$ represents an indexing cycle. Each drive period of the follower member 16 of device 10 (represented by curve 58b) involves initial acceleration of the follower member 16 to steady-state angular velocity, continued unidirectional rotary motion of the member 16 at the latter velocity, and deceleration of the member 16 back to zero velocity. Each drive period of the follower member 27 of device 11 (represented by curve 59b) is initiated later in the indexing cycle than that of member 16, and similarly includes acceleration of member 27 to a steady-state angular velocity substantially equal to that of member 16, unidirectional drive of member 27 at that velocity, and deceleration back to zero velocity. However, the follower member 16 does not then stop, but is driven by the barrel cam rib of device 11 in reverse direction for a further period (represented by portion 88 of curve 59b) before coming to a halt.

The output shaft of the apparatus is initially coupled to the follower member 16 of the device 10, being driven thereby during the initial portion of the indexing cycle. The coupling of the output shaft may be shifted to the follower member 27 of the device 11 (this shift being represented by arrow 60) at any time between $t_1$ and $t_2$, the interval during which both follower members are rotating at substantially equal steady-state angular velocities, and the output shaft is then driven by the member 27 during the remainder of the indexing cycle. At time $t_3$, when both follower members are stationary, the coupling of the output shaft is shifted back (arrow 61) to the member 16 of device 10, for the start of the next indexing cycle.

Accordingly, during each cycle the output shaft is first driven in a given direction by the follower member 16 and 27 successively, and then (being coupled to member 27) is driven in reverse direction by the reverse portion of the drive period of member 27, as may be desired for particular operations. The magnitude of the output shaft drive period may be varied, as in the case of FIGS. 4A–C and 5A–B, by changing the time of initiation of the drive period of member 27 relative to that of member 16.

In the operation shown in FIG. 11 (wherein, again, $t_0$–$t_3$ is the duration of one indexing cycle), the motion of both follower members during their respective drive periods is unidirectional. However, during the drive period of follower member 16 of device 10 (curve 58c), the follower member is initially accelerated to a velocity greater than steady-state angular velocity (as represented by portion 90 of curve 58c), then decelerated to steady-state velocity and driven at that velocity (portion A–B of curve 58c), and finally decelerated to zero velocity. The drive period of the follower member 27 of device 11 (curve 59c), which starts later and is shorter than that of member 16, involves acceleration of member 27 to a steady-state velocity substantially equal to that of member 16, continuing drive of member 27 at the latter velocity, and deceleration of member 27 back to zero velocity.

The output shaft is initially driven by member 16, and the coupling of the output shaft is shifted (arrow 60) to member 27 in the interval $t_1$–$t_2$, during which the two follower members are rotating at substantially the same steady-state angular velocity, being shifted back to member 16 (arrow 61) at time $t_3$ while both members 16 and 27 are stationary. Thus the output shaft is initially accelerated to greater-than-steady-state angular velocity by member 16 and then driven at the steady-state angular velocity by the members 16 and 27 in succession, during each indexing cycle. As in the foregoing examples, the magnitude of the output shaft drive period may be changed by altering the time of initiation of the drive period of member 27 relative to that of member 16.

It is to be understood that the invention is not limited to the features and embodiments hereinabove specifically set forth, but may be carried out in other ways without departure from its spirit.

We claim:

1. In rotary indexing apparatus, in combination,
    (a) first and second independently rotatable driven members;
    (b) driving means operable by a continuous unidirectional rotary drive for effecting individual intermittent rotary motion of said first and second driven members in predetermined time relation to each other, each of said driven members being advanced in a given direction at a steady-state angular velocity during at least a portion of each period of intermittent motion thereof, the steady-state angular velocities of said first and second driven members being substantially equal;
    (c) means shiftable between and selectively engageable with said first and second driven members for transmitting to an output shaft rotary motion of that one of said driven members engaged by said transmitting means; and
    (d) means operable by said drive for alternately shifting said transmitting means into engagement with said first and second driven members, at predetermined times, in relation to the intermittent motion of said driven members, at which the difference in respective angular velocities of said driven members is substantially zero.

2. Apparatus as defined in claim 1, including adjustable means for varying the time relation between intermittent motions of said first and second driven members effected by said driving means.

3. Apparatus as defined in claim 1 wherein said transmitting means comprises a rotatable element mounted for translation along its axis of rotation, wherein said first and second driven members are so disposed in relation to said axis of rotation that translation of said element along said axis carries and element alternately into engagement with said first and second driven members, and wherein said shifting means comprises means for effecting translation of said element along said axis between said first and second members.

4. In rotary indexing apparatus, in combination,
    (a) first and second indexing devices each comprising
        (i) a rotatable driven member and
        (ii) a rotatable driving member having a cam surface engaging said driven member for effecting intermittent rotary motion of said driven member in correspondance with continuous unidirectional rotary motion of said driving member, said intermittent motion being effected in repetitive cycles each including a drive period during which said driven member undergoes predetermined angular displacemet and a dwell period of predetermined length, said driven member being advanced in a given direction at a steady-state angular velocity during at least a portion of each said drive period,
    the driving members of said indexing devices being connected to be simultaneously continuously rotated by an input shaft and being adapted to effect rotation of the respective driven members at substantially identical steady-state angular velocities during said portions of said driving periods;
    (b) means acting on said first indexing device for adjustably varying the time of initiation of drive periods of the first-device driven member relative to the time of initiation of drive periods of the second-device driven member;
    (c) a rotatable output member shiftable between and selectively engageable with the driven members of said first and second devices respectively for transmitting to an output shaft rotary motion of that one of said driven members engaged by said output member; and
    (d) means actuated by said input shaft for alternately shifting said output member into engagement with the driven members of said first and second devices respectively, at predetermined times, in relation to the drive periods of said driven members, at which the difference in respective angular velocities of said driven members is zero.

5. Apparatus as defined in claim 4, wherein said varying means comprises means for setting the cam surface of the driving member of said first device in any selected one of a plurality of angular orientations relative to the angular orientation of the cam surface of the driving member of the second device.

6. Apparatus as defined in claim 5, wherein the driven members of said first and second devices are disposed in facing spaced relation to each other along a common axis of rotation, and wherein said output member is mounted intermediate said driven members for rotation about said common axis and for translation along said axis into selective engagement with either of said driven members, said shifting means comprising means for effecting translation of said output member along said common axis as aforesaid.

7. Apparatus as defined in claim 6, wherein, said shifting means comprises
    (a) a fork having prong portions slidably engaging opposite faces of said output member;
    (b) means supporting said fork for reciprocating movement along a path parallel to said common axis; and
    (c) a pair of cams respectively carried by the driving members of said first and second devices for rotation therewith, said cams being positioned and adapted to alternately engage said supporting means during rotation of said driving members for effecting reciprocating movement of said fork along said path.

8. Apparatus as defined in claim 6, wherein said output member and the driven members of said first and second devices are mutually adapted for positive tooth-and-socket engagement of said output member with either of said driven members in any of a plurality of angular positions of said output member relative to the driven member engaged thereby.

9. Apparatus as defined in claim 8, wherein said output member bears a pair of projections both having rounded extremities and respectively extending toward the driven members of said first and second devices, and wherein each of said driven members has a plurality of spaced sockets positioned and dimensioned to receive the projection of said output member extending toward that one of the driven members.

10. Apparatus as defined in claim 6, wherein said output member and the driven members of said first and second devices have facing surfaces respectively adapted for frictional clutching engagement of said output member with either of said driven members.

11. Apparatus as defined in claim 5, wherein the driven members of said first and second devices are disposed for rotation about parallel axes, and wherein said output member is mounted for rotation about an axis intermediate and parallel to the axes of rotation of the two driven members, said driven members of said first and second devices including portions for drivably engaging said output member respectively positioned for rotation in spaced planes of rotation and said output member being translatable along its axis of rotation into alternate engagement with said last-mentioned portions of said driven members, said shifting means comprising means for effecting translation of said output member along its axis of rotation as aforesaid.

12. Apparatus as defined in claim 4, wherein the rotatable driving members of both said indexing devices effect unidirectional rotary motion of the respective driven members of said devices.

References Cited

UNITED STATES PATENTS

| | | | |
|---|---|---|---|
| 2,852,960 | 9/1958 | Brems | 74—821 |
| 3,187,420 | 6/1965 | Poupitch | 74—84 |
| 3,199,373 | 8/1965 | Veale | 74—84 |

FRED C. MATTERN, Jr., Primary Examiner

F. D. SHOEMAKER, Assistant Examiner

U.S. Cl. X.R.

74—827; 226—156